United States Patent [19]
Chorlton et al.

[11] Patent Number: 5,744,590
[45] Date of Patent: Apr. 28, 1998

[54] MONOAZO PIGMENTS

[75] Inventors: Alan Patrick Chorlton, Stockport; James Mason, Rochdale, both of United Kingdom

[73] Assignee: Zeneca Limited, London, England

[21] Appl. No.: 875,071

[22] PCT Filed: Dec. 5, 1995

[86] PCT No.: PCT/GB95/02833

§ 371 Date: Jul. 17, 1997

§ 102(e) Date: Jul. 17, 1997

[87] PCT Pub. No.: WO96/22334

PCT Pub. Date: Jul. 25, 1996

[30] Foreign Application Priority Data

Jan. 20, 1995 [GB] United Kingdom ............... 9501089

[51] Int. Cl.⁶ ..................... C09B 63/00; C09B 67/20
[52] U.S. Cl. ................... 534/780; 534/728; 534/DIG. 4; 106/496
[58] Field of Search .................. 534/780, 728, 534/DIG. 4

[56] References Cited

U.S. PATENT DOCUMENTS 3,802,836  4/1974  Speck .................. 534/780 X
5,457,188  10/1995  Zimmerman ............... 534/780

FOREIGN PATENT DOCUMENTS 225 533  6/1987  European Pat. Off. .

OTHER PUBLICATIONS

Gasparic et al: "Effect of the number of sulpho group on the electrophoretic mobility of sulphonated azo dyes", Journal of Chromatography A, vol. 665, No. 1, 1994, pp. 197–202, XP002002367, see table 2.

*Primary Examiner*—Fiona T. Powers
*Attorney, Agent, or Firm*—Pillsbury Madison & Sutro LLP

[57] ABSTRACT

An azo pyrazolone compound of the formula:

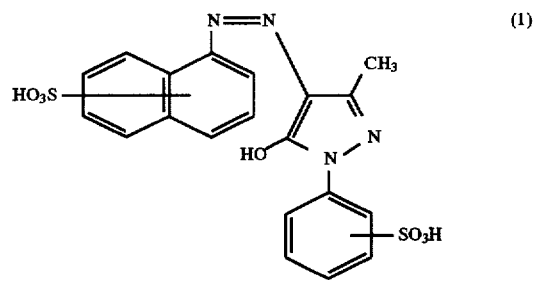

in the form of a salt, and its use as a pigment.

8 Claims, No Drawings

MONOAZO PIGMENTS

This application is a 371 of PCT/GB95/02833, filed Dec. 5,1995 which was designated the U.S.

This invention relates to monoazo pigments and more particularly to orange pigments of the azo pyrazolone series.

J. of Chromatography, 665, 197 (1994) discloses certain sulphonated azopyrazolones and the corresponding sodium and potassium salts.

European patent EP 0 225 553 discloses certain isomeric azopyrazolones as the calcium salts.

The use of pigments for the colouring of plastics materials is well known. For the production of orange colorations, it has been traditional to employ inorganic pigments such as cadmiums, lead chromes and molybdate oranges but these are now being phased out because of environmental pressures. Organic pigments that have been proposed as replacements for these inorganic materials have not been found entirely satisfactory in all of the major polymer types, especially in respect of their heat stability.

It has now been found that certain organic pigments of the azo pyrazolone series are characterised by excellent heat stability, light stability, and bleed fastness when used in a wide range of plastics materials.

Accordingly, the invention provides an azo pyrazolone compound of the formula:

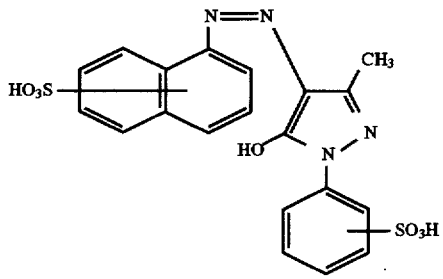

in the form of a salt.

The salts of the compounds of Formula 1 may exhibit polyphormism and, where this is the case, the various polymorphic forms are regarded as within the scope of the invention.

Particularly advantageous compounds of Formula 1 in terms of superior heat and light stability are compounds in which the sulphonic acid group of the naphthalene nucleus is present in the 4- or 6-position relative to the azo link and the sulphonic acid group of the benzene ring is present in the 3- or 4-position relative to the pyrazolyl group.

The salt of the azo pyrazolone compound of Formula 1 may be a metal salt, for example, an alkali metal, alkaline earth metal or heavy metal salt, or a salt of a nitrogenous base, for example a primary, secondary or tertiary amine or quaternary ammonium salt, particularly useful pigments being the salts of barium, strontium, manganese, magnesium, sodium and, especially, calcium.

The most preferred compounds of the invention have the formula:

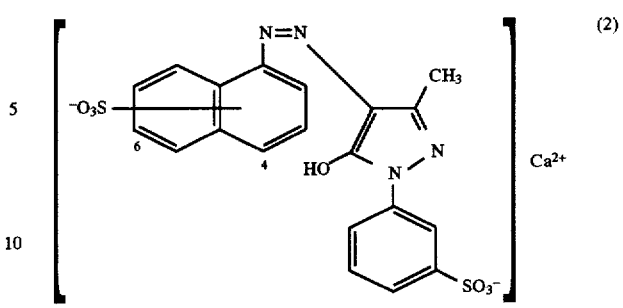

wherein the sulphonate group of the naphthalene nucleus is in the 4- or 6-position relative to the azo group.

The azo pyrazolone compounds of the invention may be prepared by diazotising a naphthylamine sulphonic acid of the formula:

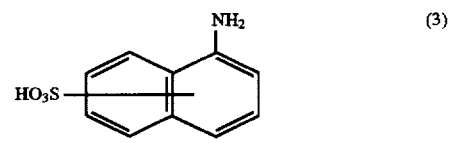

and coupling the resulting diazo compound with a sulphonated 3-methyl-1-phenylpyrazol-5-one of the formula:

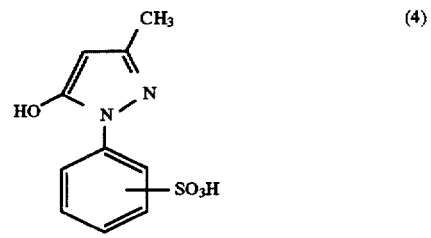

and converting the resulting monoazo compound to the desired salt form.

The diazotisation and coupling reactions may be performed in a conventional manner appropriate to the classes of compound being used.

The preferred naphthylamine sulphonic acids for use in preparing the compounds of the invention are 1-naphthylamine-4-sulphonic acid and 1-naphthylamine-6-sulphonic acid whilst the preferred coupling components are 3-methyl-1-(4'-sulphophenyl)pyrazol-5-one and, especially 3-methyl-1-(3'-sulphophenyl)pyrazol-5-one.

It is often convenient to prepare the compound of Formula 1 in the form of a sodium salt and then convert the sodium salt to, for example, an alkaline earth or heavy metal lake by adding the required amount of a water-soluble alkaline earth metal or heavy metal salt, usually in the form of an aqueous solution.

Surface active agents and/or organic solvents may optionally be present during the synthesis of the compound of Formula 1 and/or during precipitation of the pigment.

The compounds of the invention, which may be subjected to conventional milling operations and/or thermal treatments in order to provide products of the desired particle size and/or crystal structure, are useful orange pigments which may be used in conventional manner. In particular, they may be used alone or in conjunction with other pigments for the coloration of plastics materials, for example polyvinyl chloride, polyolefins, polystyrene and ABS where they exhibit excellent properties. The compounds of the invention are also valuable for the pigmentation of surface coatings.

The invention is illustrated but not limited by the following Examples.

EXAMPLE 1

1-Naphthylamine-6-sulphonic acid (4.46 g), de-ionised water (50 ml) and hydrochloric acid (5.1 ml) were stirred together in a vessel surrounded by an ice-bath, followed by sufficient 48% sodium hydroxide solution to form a solution alkaline to Brilliant Yellow paper. The solution was then cooled to 0–5° C. and a further amount (5.1 ml) of hydrochloric acid was added. A solution of sodium nitrite (1.56 g) in de-ionised water (5 ml) was added all at once and the mixture was stirred at 0–5° C. for 30 mins. Excess nitrite was then removed by adding a few ml of 10% sulphamic acid solution 3-Methyl-1-(3'-sulphophenyl) pyrazol-5-one (5.4 g) was added to de-ionised water (50 ml) and the pH was adjusted to 6.5 by the addition of 48% sodium hydroxide solution. The solution was then stirred at 0–5° C. and the diazo suspension obtained as described above was added over 10 mins whilst maintaining the pH at 6.5 by the addition of 48% sodium hydroxide solution. The coupling mixture was then stirred overnight at room temperature.

The reaction mixture was then heated to 90° C. and a solution of calcium chloride (32 g $CaCl_2$ in 40 ml water) was added all at once and the mixture stirred for a further 3 hours at 90° C. The mixture was then filtered hot and the product was washed chloride-free with de-ionised water (1000 ml) and dried giving 7.3 g of an orange solid.

EXAMPLE 2

1-Naphthylamine-4-sulphonic acid, sodium salt (6.14 g), deionised water (50 ml) and hydrochloric acid (5.1 ml) were stirred together in a vessel surrounded by an ice bath, followed by sufficient 48% sodium hydroxide solution to form a solution alkaline to Brilliant Yellow paper. The solution was then cooled to 0–5° C. and a further amount (5.1 ml) of hydrochloric acid was added. A solution of sodium nitrite (1.56 g) in deionised water (5 ml) was added all at once and the mixture was stirred at 0–5° C. for 30 mins. Excess nitrite was then removed by adding a few ml of 10% sulphamic acid solution.

3-Methyl-1-(3'-sulphophenyl)pyrazol-5-one (6.08 g) was added to deionised water (50 ml) and the pH was adjusted to 6.5 by the addition of 48% sodium hydroxide solution. The solution was then stirred at 0–5° C. and the diazo suspension obtained as described above was added over 10 mins whilst maintaining the pH at 6.5 by the addition of 48% sodium hydroxide solution. The coupling mixture was then stirred overnight at room temperature.

The reaction mixture was then heated to 90° C. and a solution of calcium chloride (32 g $CaCl_2$ in 40 ml water) was added all at once and the mixture stirred for a further 3 hours at 90° C. The mixture was then filtered hot and the product was washed chloride-free with deionised water (1000 ml) and dried giving 8.4 g of a orange solid.

EXAMPLE 3

1-Naphthylamine-4-sulphonic acid, sodium salt (5.74 g), deionised water (50 ml) and hydrochloric acid (5.1 ml) were stirred together in a vessel surrounded by an ice bath, followed by sufficient 48% sodium hydroxide solution to form a solution alkaline to Brilliant Yellow paper. The solution was then cooled to 0–5° C. and a further amount (5.1 ml) of hydrochloric acid was added. A solution of sodium nitrite (1.56 g) in deionised water (5 ml) was added all at once and the mixture was stirred at 0–5° C. for 30 mins. Excess nitrite was then removed by adding a few ml of 10% sulphamic acid solution.

3-Methyl-1-(4'-sulphophenyl)pyrazol-5-one (5.6 g) was added to deionised water (50 ml) and the pH was adjusted to 6.5 by the addition of 48% sodium hydroxide solution. The solution was then stirred at 0–5° C. and the diazo suspension obtained as described above was added over 10 mins whilst maintaining the pH at 6.5 by the addition of 48% sodium hydroxide solution. The coupling mixture was then stirred overnight at room temperature.

The reaction mixture was then heated to 90° C. and a solution of calcium chloride (32 g $CaCl_2$ in 40 ml water) was added all at once and the mixture stirred for a further 3 hours at 90° C. The mixture was then filtered hot and the product was washed chloride-free with deionised water (1000 ml) and dried giving 3.4 g of an orange solid.

I claim:

1. An azo pyrazolone compound of the formula:

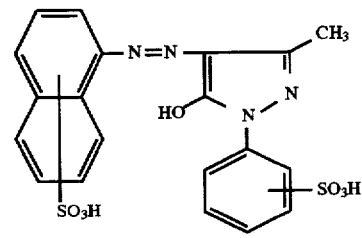

in the form of a salt except for

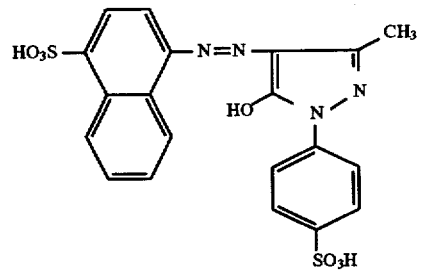

and

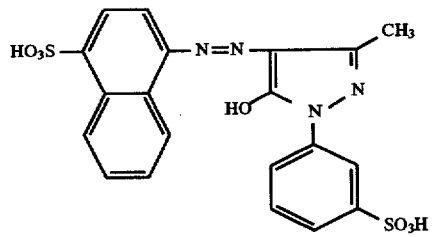

in the form of their sodium and potassium salts.

2. A compound according to claim 1 wherein the sulphonic acid group in the naphthalene nucleus is in the 4- or 6- position relative to the azo link and the sulphonic acid group in the benzene ring is in the 3- or 4-position relative to the pyrazolyl group.

3. A compound according to claim 1 or claim 2 wherein the salt is a metal salt or a salt of a nitrogenous base.

4. A compound according to claim 3 wherein the salt is a calcium salt.

5. A compound according to claim 4 having the formula:

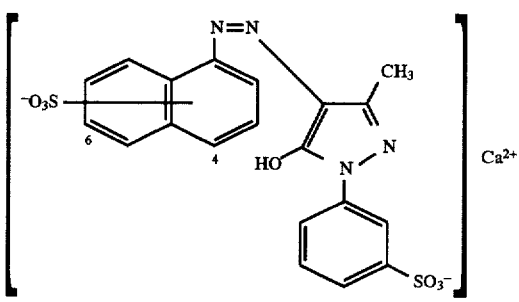

wherein the sulphonate group in the naphthalene nucleus is in the 4- or 8-position relative to the azo link.

6. A method for the preparation of an azo pyrazolone compound as defined in claim 1 which comprises diazotising a naphthylamine sulphonic acid of the formula:

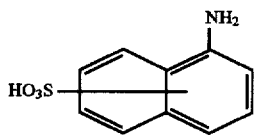

and coupling the resulting diazo compound with a sulphonated 3-methyl-1-phenylpyrazol-5 -one of the formula:

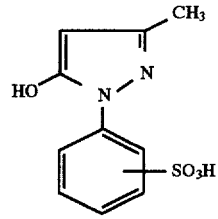

and converting the resulting monoazo compound to the desired salt form.

7. A method according to claim 6 wherein the naphthylamine sulphonic acid comprises 1-naphthylamine-4-sulphonic acid and/or 1-naphthylamine-6-sulphonic acid.

8. A method according to claim 6 or claim 7 wherein the sulphonated 3-methyl-1-phenylpyrazol-5-one comprises 3-methyl-1(4'-sulphophenyl)pyrazol-5-one and/or 3-methyl-1-(3'-sulphophenyl)pyrazol-5-one.

* * * * *

UNITED STATES PATENT AND TRADEMARK OFFICE
CERTIFICATE OF CORRECTION

PATENT NO. : 5,744,590
DATED : Apr. 28, 1998
INVENTOR(S) : Chorlton et al.

It is certified that error appears in the above-identified patent and that said Letters Patent is hereby corrected as shown below:

Column 5, line 16, change "8-position" to --6-position--.

Signed and Sealed this

Fourteenth Day of March, 2000

Attest:

Q. TODD DICKINSON

Attesting Officer

Commissioner of Patents and Trademarks